(12) United States Patent
Thimirachandra et al.

(10) Patent No.: US 9,677,881 B2
(45) Date of Patent: Jun. 13, 2017

(54) METHOD AND APPARATUS FOR IDENTIFYING AN EDGE OF AN OBJECT USING LASER DISTANCE MEASUREMENT

(71) Applicant: SYMBOL TECHNOLOGIES, INC., Schaumburg, IL (US)

(72) Inventors: Sanjeewa Thimirachandra, Kotugoda (LK); Ruwan Jayanetti, Nugegoda (LK); Sadeepa L Sepala, Horana (LK); Anuradha Tennakoon, Battaramulla (LK)

(73) Assignee: Symbol Technologies, LLC, Holtsville, NY (US)

( * ) Notice: Subject to any disclaimer, the term of this patent is extended or adjusted under 35 U.S.C. 154(b) by 710 days.

(21) Appl. No.: 14/133,891

(22) Filed: Dec. 19, 2013

(65) Prior Publication Data

US 2015/0176987 A1 Jun. 25, 2015

(51) Int. Cl.
*G01C 3/08* (2006.01)
*G01B 11/28* (2006.01)
*G01B 11/02* (2006.01)

(52) U.S. Cl.
CPC .......... *G01B 11/285* (2013.01); *G01B 11/028* (2013.01)

(58) Field of Classification Search
CPC .............................. G01B 11/285; G01B 11/028
See application file for complete search history.

(56) References Cited

U.S. PATENT DOCUMENTS

| | | |
|---|---|---|
| 6,560,560 B1 | 5/2003 | Tachner |
| 6,847,435 B2 | 1/2005 | Honda et al. |
| 7,751,033 B2 | 7/2010 | Skultety-Betz et al. |
| 8,401,816 B2 | 3/2013 | Thierman et al. |
| 2006/0142969 A1 | 6/2006 | Gogolla et al. |
| 2006/0268261 A1 | 11/2006 | Chien et al. |
| 2010/0085578 A1 | 4/2010 | Weiss et al. |
| 2014/0177956 A1* | 6/2014 | Hummel .............. G06K 9/4604 382/165 |

FOREIGN PATENT DOCUMENTS

| | | |
|---|---|---|
| GB | 2347810 A | 9/2000 |
| KR | 2012055902 A | 6/2012 |

* cited by examiner

*Primary Examiner* — Luke Ratcliffe
*Assistant Examiner* — Samantha K Abraham

(57) ABSTRACT

A method and apparatus for identifying an edge of a target object using laser distance measurement. The method comprises rotating a laser distance measuring head in intervals of a predetermined angle in a first direction. Further, at each step of rotation, directing a scan beam onto the target object at a point of incidence and measuring a distance between the laser distance measuring head and the point of incidence. When a difference between a measured distance at a first step of rotation and a measured distance at a second step of rotation exceeds beyond a predetermined threshold value, identifying, that an edge of the target object has occurred at the point of incidence of the scan beam corresponding to the second step of rotation, wherein the second step of rotation precedes the first step of rotation.

19 Claims, 9 Drawing Sheets

METHOD AND APPARATUS FOR IDENTIFYING AN EDGE OF AN OBJECT USING LASER DISTANCE MEASUREMENT

BACKGROUND OF THE INVENTION

Various electro-optical systems have been developed for measuring dimensions of an object. One such electro-optical system is a conventional laser distance-measuring device. The laser distance-measuring device, for example, may comprise a microcontroller, a non-erasable memory, a mass memory, a keypad, a display, a radiation source, and a radiation receiver. The microcontroller controls the radiation source to emit a modulated laser beam. The laser beam is received by the radiation receiver after being reflected by a target object, and is modulated by the microcontroller. The time that the laser beam takes during the journey is recorded, and is multiplied by a propagation velocity of the laser beam to determine the distance that the device is distant from the target object. Data for the measurement is stored in the mass memory, and the result is shown on the display. In addition, operation modes and correction algorithms, which are stored in the non-erasable memory, can be selected through the keypad for desired result of the measurement.

Although the conventional laser distance-measuring device can measure a straight distance of an object from the laser distance-measuring device, it has difficulty measuring a distance between two spaced points. This measurement often is necessary in the fields of architecture and construction. For example, workers may need to measure the height of a box, a wall, a tree, or a building.

Further, in order to detect an edge or to measure dimensions of a target object, the conventional laser distance-measuring device requires a user to hold the laser distance-measuring device in his/her hands and manually aim the laser scan beam onto a target object. The user then needs to gradually move the device so that the laser scan beam sweeps across the target object. This method results in readings that may be prone to error, as an accidental movement of the hand of the user holding the device would affect the measurement of dimensions of the target object. Further, the conventional laser distance-measuring device does not automatically identify an edge of the target object. The user operating the conventional laser distance-measuring device is solely responsible for identifying the edge based on his/her judgment or view of the target object. For example, when the laser scan beam appears to have reached to an edge of the target object, the user may release a trigger switch. However, this method of identifying the edge of the target object may also be prone to human error.

Accordingly, it is desirable to have a more reliable solution for identifying an edge and measure dimensions of an object with laser distance measurement.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
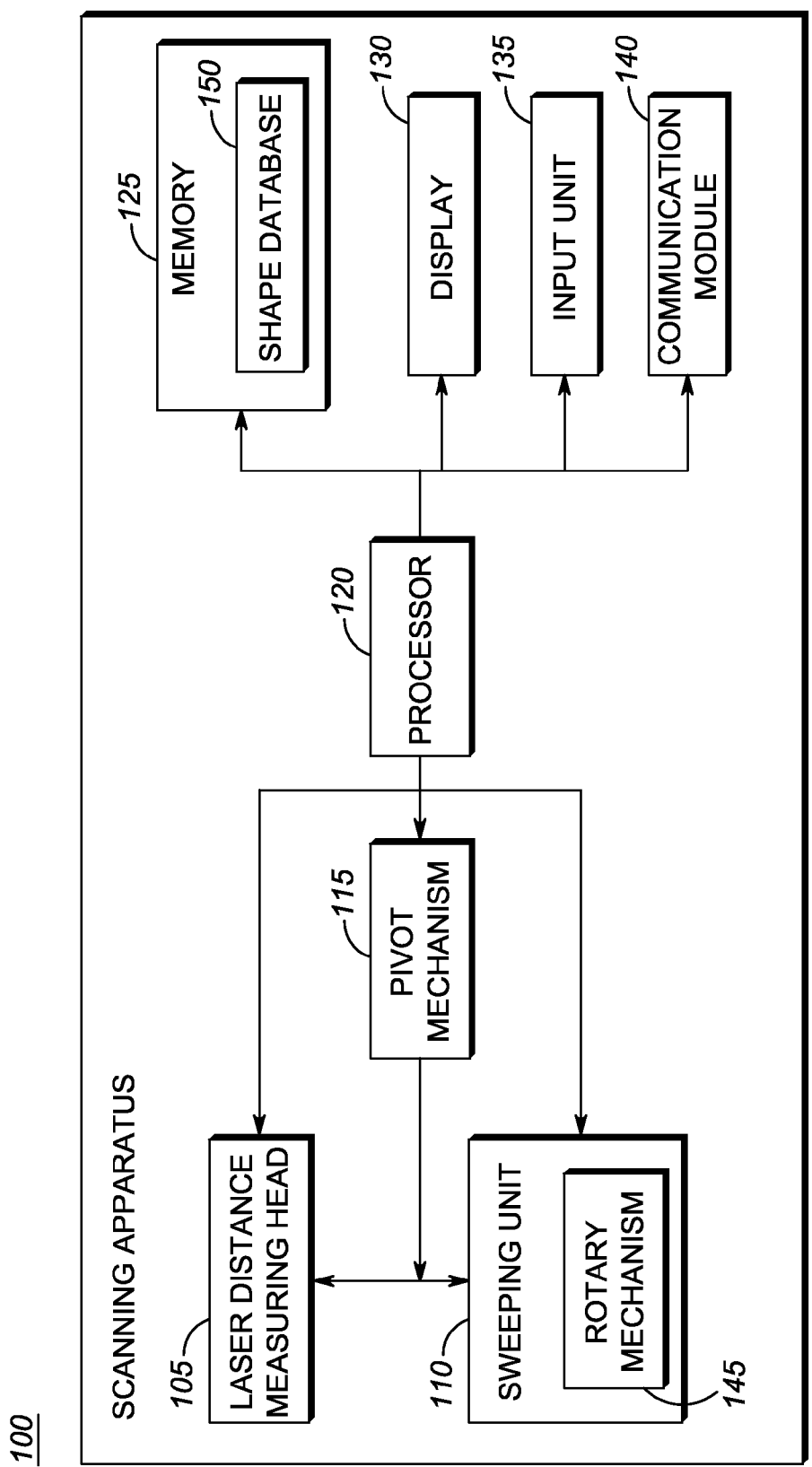
FIG. 1 is a block diagram of a scanning apparatus for identifying an edge of a target object in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, the subject disclosure is directed to a method of operating a scanning apparatus comprising a laser distance measuring head for identifying an edge of a target object. The method includes operating the scanning apparatus to rotate the laser distance measuring head in intervals of a predetermined angle in a first direction. At each step of rotation, the laser distance measuring head directs a scan beam onto the target object at a point of incidence. Further, at each step of rotation, the scanning apparatus measures a distance between the laser distance measuring head and a point of incidence of the scan beam on the target object. The scanning apparatus further determines when a difference between a measured distance at a first step of rotation and a measured distance at a second step of rotation exceeds beyond a predetermined threshold value, wherein the second step of rotation precedes the first step of rotation. When the difference exceeds the predetermined threshold value, the scanning apparatus identifies that a first edge of the target object has occurred at a point of incidence of the scan beam corresponding to the second step of rotation.

FIG. 1 is a block diagram of a scanning apparatus 100 for identifying an edge of a target object in accordance with the disclosed embodiments. In one embodiment as shown in FIG. 1, the scanning apparatus 100 comprises a laser distance measuring head 105, a sweeping unit 110, a pivot mechanism 115, a processor 120, a memory 125, a display 130, an input unit 135, and a communication module 140. In accordance with various embodiments of the present disclosure, the scanning apparatus 100 is used to identify edges of a target object. The target object can be of any shape and represent any object (such as a box, wall, container etc.) located in a range of working distances from the scanning apparatus 100 for which one or more edges, dimensions, and the like can be identified. As used herein, the term "edge" represents a point, a line, or a border at which a surface of the target object terminates. Thus, an edge is an outside limit of the target object.

Further, the number of edges required to be identified by the scanning apparatus 100 may vary depending on the dimensions to be determined. For example, when the measurement of a length is desired, the identification of two edges (left edge and right edge) would be required. Similarly, when a height measurement is desired, the identification of two edges (top edge and bottom edge) would be required. Further, the number of edges required to be identified also depends on the shape of the target object. For example, for measuring an area of a square shaped target object, the scanning apparatus 100 would identify four edges (left edge, right edge, top edge, and bottom edge) of a surface of the target object. Alternatively, for measuring an area of a circular target object, the scanning apparatus 100 would identify two edges (i.e. two tangent points) of the target object. In accordance with some embodiments, the processor 120 controls the laser distance measuring head 105, the sweeping unit 110, and the pivot mechanism 115 to facilitate identification of edges and, subsequently, measurement of dimensions of the target object.

The processor 120 includes one or more microprocessors, microcontrollers, DSPs (digital signal processors), state machines, logic circuitry, or any other device or devices that process information based on operational or programming instructions. Such operational or programming instructions (not shown) are stored in a memory 125. The memory 125 can be any non-transitory memory such as an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 120 has one or more of its functions performed by a state machine or logic circuitry, the memory containing the corresponding operational instructions can be embedded within the state machine or logic circuitry.

As described previously herein, for measurement of dimensions of a target object, the number of edges to be identified by the scanning apparatus 100 depends on the shape of the target object. In this regard, the processor 120 accesses the memory 125 including a shape database 150 to determine the number of edges to be identified. The shape database 150 contains lists of different types of target objects based on their shape, such as cubical, cylindrical, conical, circular, and the like, and a corresponding dimension computing function for each shape. The shape of the target object is also a function of the type of the target object, such as a two-dimensional target object, a three-dimensional target object, and the like. Shapes for a two-dimensional target object can be selected from a group of shapes, such as square, rectangular, circular, and the like. Shapes for a three-dimensional target object can be selected from another group of shapes, such as cubical, cuboidal, cylindrical, conical, spherical, and the like. Thus, for measurement of dimensions of the target object, such as length, width, and height, the processor 120 firstly determines the shape of the target object. The shape of the target object can be user selectable, wherein a user provides an input corresponding to the shape of the target object via the input unit 135. In an embodiment, the user selects the shape of the target object from a list of shapes displayed on the display 130 of the scanning apparatus 100. Alternatively, the shape of the target object is automatically determined by the scanning apparatus 100 via an imager (not shown), sensors, and the like. Further, the processor 120, in response to determining the shape of the target object, determines the number of edges to be identified based either on user input or pre-configured input corresponding to the dimensions that are required to be measured.

On determining the number of edges to be identified for measuring dimensions based on the shape of the target object, the processor 120 controls the operation of the laser distance measuring head 105, the sweeping unit 110, and the pivot mechanism 115 to scan one or more surfaces of the target object to identify one or more edges.

In accordance with some embodiments, the processor 120 controls the laser distance measuring head 105 to generate a scan beam and direct the generated scan beam onto a surface of the target object at a point of incidence. The laser distance measuring head 105 comprises an optical assembly (not shown) to generate and direct the scan beam. The optical assembly comprises an optical source, such as a laser for generating the scan beam. It should be noted that the scanning apparatus 100 may comprise any optical light source that is capable of generating a scan beam suitable for measurement of a distance between the scanning apparatus 100 and the target object. In this regard, in one embodiment, the optical source is a light emitting diode (LED) that generates the scan beam. The optical assembly may further comprise one or more focusing lens and other circuitry, to optically modify and direct the scan beam through an exit port or window in the housing of the scanning apparatus 100 onto the target object.

As described previously herein, different edges of the target object may be identified based on the desired dimension and the shape of the target object. For example, to measure an area of a square shaped target object, the scanning apparatus 100 may identify four edges i.e. left edge, right edge, top edge and bottom edge of a surface of the target object. In this case, the scan beam generated and directed by the laser distance measuring head 105 would be swept across the surface of the target object in a linear sweeping pattern along a horizontal direction (for left and right edges) and a vertical direction (for top and bottom edges). In this regard, the processor 120 is further operatively coupled to the sweeping unit 110 and the pivot mechanism 115.

The sweeping unit 110 comprises a rotary mechanism 145 coupled to the laser distance measuring head 105. The rotary mechanism 145 is operable to rotate the laser distance measuring head 105 in intervals of a predetermined angle in a particular direction. The processor 120 controls the rotary mechanism 145 to rotate the laser distance measuring head 105, such that a rotary motion of the laser distance measuring head 105 translates into a linear sweeping pattern of the scan beam directed by the laser distance measuring head 105. For example, when the laser distance measuring head 105 is rotated in a clockwise direction by the rotary mechanism 145, the scan beam generated by the laser distance measuring head 105 is directed onto a surface of the target object from a left to right direction in a linear sweeping pattern. Alternatively, when the laser distance measuring head 105 is rotated in a counter-clockwise direction, the scan beam generated by the laser distance measuring head 105 is directed onto the surface of the target object from a right to left direction in a linear sweeping pattern. The rotary mechanism 145 refers to an arrangement coupled to the laser distance measuring head 105 for facilitating a step-wise progressing linear sweeping pattern of the scan beam generated by the laser distance measuring head 105. As such, the rotary mechanism 145 may comprise a servo motor with a position feedback mechanism, electromagnetic arrangements, mirror arrangements, pneumatic/hydraulic based arrangements, piezoelectric based arrangements, and the like. In one embodiment, the rotary mechanism 145 comprises a stepper motor, wherein a path of rotation of the rotary mechanism 145 is divided into a number of steps of rotation of equal intervals. For example, the path of rotation of the rotary mechanism 145 may be pre-configured or user configured to be divided into equal intervals of angle of rotation, such as one (1) degree, five (5) degrees, ten (10) degrees, and the like.

Further, the direction of progression (i.e. along horizontal or vertical directions) of the linear sweeping pattern of the scan beam depends on an axis of rotation of the laser distance measuring head 105. For example, when the axis of rotation of the laser distance measuring head 105 is parallel to a plane of the surface of the target object, the scan beam sweeps across the surface of the target object in a horizontal direction (left-to-right or right-to-left direction). This facilitates identification of left and right edges of the target object. Further, when the axis of rotation of the laser distance measuring head 105 is perpendicular to the plane of the surface of the target object, the scan beam sweeps across the surface of the target object in a vertical direction (upwards-to-downwards or downwards-to-upwards direction). This facilitates identification of top and bottom edges of the target object. In this regard, the processor 120 is further operatively coupled to the pivot mechanism 115 to facilitate adjustment of the axis of rotation of the laser distance measuring head 105.

The pivot mechanism 115 is coupled to a mount (see FIG. 2, mount 215) that houses the laser distance measuring head 105 and the sweeping unit 110. The pivot mechanism 115 can be controlled to rotate the mount by a certain angle, such as by ninety (90) degrees, to cause the rotation of the entire arrangement of the laser distance measuring head 105 and the sweeping unit 110 by the certain angle. This rotation of the entire arrangement of the laser distance measuring head 105 and the sweeping unit 110 by the pivot mechanism 115 facilitates the axis of rotation of the laser distance measuring head 105 to be adjusted. The processor 120 is operable to control the pivot mechanism 115 to rotate the mount such that the axis of rotation of the laser distance measuring head 105 is either perpendicular or parallel to the plane of the surface of the target object. In one embodiment, when a length of the target object (such as a box) is required to be measured, the processor 120 operates the pivot mechanism 115 to ensure that the axis of rotation of the laser distance measuring head 105 is parallel to the plane of the surface of the target object, so that the scan beam sweeps across the surface of the target object in a left-to-right or a right-to-left direction for the scanning apparatus 100 to determine the length of the target object. Further, when a height of the target object is required to be measured, the processor 120 operates the pivot mechanism 115 to rotate the mount (if required) to ensure that the axis of rotation of the laser distance measuring head 105 is perpendicular to the plane of the surface of the target object, so that the scan beam sweeps across the surface of the target object in an upwards-to-downwards or a downwards-to-upwards direction for the scanning apparatus 100 to determine the height of the target object.

In accordance with some embodiments, to identify an edge of the target object, the processor 120 is operable to control the rotary mechanism 145 to rotate and hold at each step of rotation, thereby rotating the laser distance measuring head 105 coupled to the rotary mechanism 145 in intervals of the predetermined angle in a first direction (i.e. clockwise or counter-clockwise direction). The processor 120 further controls the laser distance measuring head 105 to generate and direct the scan beam onto the target object at a point of incidence at each step of rotation of the rotary mechanism 145, thereby causing the scan beam to sweep across the surface of the target object in a linear sweeping pattern. The direction of progression of the linear sweeping pattern of the scan beam depends on the direction of rotation of the laser distance measuring head 105 (i.e. clockwise or counter-clockwise) and the orientation (perpendicular or parallel) of the axis of rotation of the laser distance measuring head 105 with respect to the plane of the surface of the target object, as described above. The laser distance measuring head 105 further may comprise a photo detector (not shown) that collects at least a portion of the light reflected and/or scattered from the target object and converts the received light into an analog electrical signal. The processor 120, based on phase information and/or a time-of-flight measurement between the incident scan beam and the received light, determines a distance between the laser distance measuring head 105 and a point of incidence of the scan beam on the target object at each step of rotation. In accordance with some embodiments, whenever an abrupt change in the nominal distance pattern after each step of rotation is detected, the scanning apparatus 100 determines that an edge on the target object has been reached. The term 'abrupt change' as used herein refers to a change beyond a threshold in the nominal distance pattern, such that the change does not match a periodic change observed in distances measured at each step of rotation. In one embodiment, the processor 120 determines the 'abrupt change' based on a difference between a measured distance at a current step of rotation and a measured distance at a previous step of rotation. When the difference between the measured distances is greater than a predetermined threshold, then the processor 120 identifies that a first edge of the target object has occurred at a point of incidence of the scan beam corresponding to the previous step of rotation. Thus, an edge of the target object is identified when a difference between the measured distances at two consecutive steps of rotation exceeds the predetermined threshold value. That is, when an abrupt change in the nominal distance pattern is detected, it implies that the scan beam at the current step of rotation did not hit the target object (such as a box) but passed along its edge to infinite space/objects around the target object. In one embodiment, the target object is a wall of a room, so that an abrupt change in the nominal distance pattern implies that a corner of the room has been detected. Thus, the processor 120 detects this deviation in the measured distance pattern, specifically when compared to the distance measured at the preceding step of rotation, and determines that the edge of the target object has occurred at the point of incidence of the scan beam corresponding to the preceding step of rotation.

When the difference between the measured distance corresponding to a current step of rotation and a previous step of rotation does not exceed the predetermined threshold value (i.e. no abrupt change is detected in the nominal distance pattern), the process of measuring a difference between measured distances is repeated after each step of rotation until an edge is detected on the target object. Specifically, the processor 120 repeats the steps of operating the rotary mechanism 145 to rotate the laser distance measuring head 105 by the predetermined angle, operating the laser distance measuring head 105 to generate and direct a scan beam onto the target object at a point of incidence, and measuring a distance between the laser distance measuring head 105 and a point of incidence of the scan beam on the target object, until a first edge of the target object is identified. Once the first edge of the target object is detected, the processor 120 proceeds to control the rotary mechanism 145 to rotate the laser distance measuring head 105 in an opposite direction to similarly detect a second edge of the target object.

Thus, the scanning apparatus 100 as disclosed herein is operable to identify one or more edges of the target object based on the dimensions to be measured and the shape of the target object. The scanning apparatus 100 further comprises the input unit 135. In one embodiment, the input unit 135 is used to receive input from the user regarding the shape of target object to be scanned and/or dimensions to be measured. The input unit 135 may comprise a keypad, keyboard, touch panel, pressure sensitive surface, card reader (e.g., a credit card reader, debit card reader, access card reader, smart card reader, and the like), barcode reader, radio-frequency identification (RFID) reader, magnetic stripe reader, mouse, joystick, knob, microphone, or another suitable device, configured to receive inputs from a user of the scanning apparatus 100.

In one embodiment, the scanning apparatus 100 further comprises a communication module 140. The communication module 140 refers to an interface equipped with one or more of combinations of a transmitter and receiver circuitry, an antenna, a wired interface, a radio interface, and/or any additional components enabling the scanning apparatus 100 to be communicatively coupled to another device. In one embodiment, the communication module 140 enables the scanning apparatus 100 to communicate the measured dimensions to a remote server via a wireless link.

Figure 2:
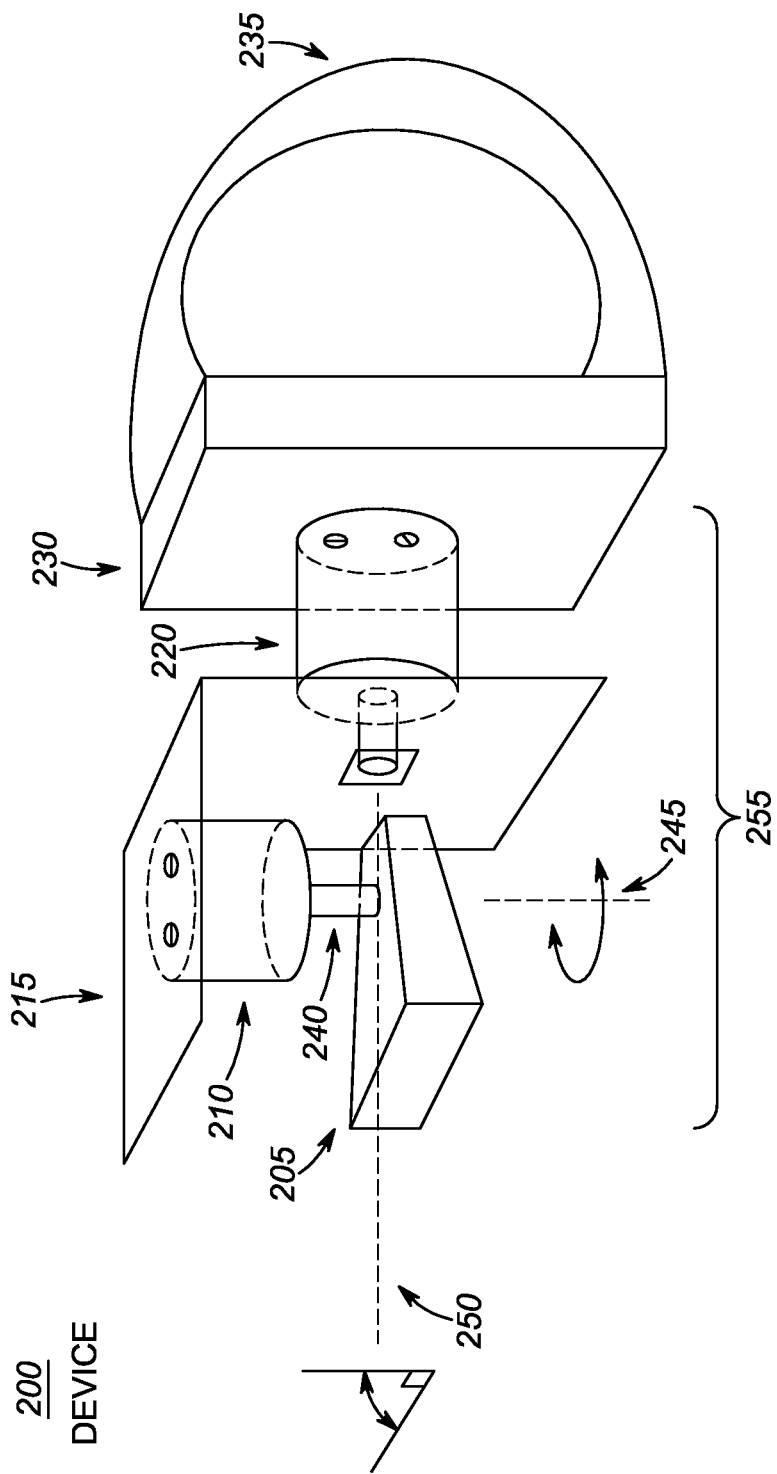
FIG. 2 is a pictorial view of the scanning apparatus of FIG. 1 coupled to a handle in accordance with some embodiments.

FIG. 2 illustrates a device 200 for identifying an edge of a target object in accordance with some embodiments. The device 200 includes a front portion 255 and a handle 235. The front portion 255 corresponds to the scanning apparatus 100, as described with reference to FIG. 1. The front portion 255 is coupled to the handle 235 for a handheld operation of the device 200. The handle 235 enables a user to hold the device 200 and aim a laser distance measuring head 205 towards a target object in the workable range of the device 200. In one embodiment, the handle 235, along with enabling easy handling of the device 200, further comprises additional circuitry for operating the device 200. For example, the handle 235 may comprise a processor, a memory, a display, an input unit (such as a keypad, etc.), communication module, and other components required for the operation of the device 200. In one embodiment, the device 200 is a manually-actuated device, wherein the handle 235 comprises a trigger switch (not shown) to permit an operator to initiate the scanning operation when the operator holds and aims the laser distance measuring head 205 towards the target object.

The handle 235 is coupled to a fixed mount 230, such that the fixed mount 230 connects the handle 235 to the front portion 255 of the device 200. In some embodiments, the fixed mount 230 may comprise additional circuitry or components of the scanning apparatus 100, such as the processor 120, the memory 125, communication module 140, and other components required for the operation of the device 200. Further, the fixed mount 230 acts as a fixed support for mounting a pivot mechanism 220, corresponding to the pivot mechanism 115 as depicted in FIG. 1. The other end of the pivot mechanism 220 is coupled to a mount 215 that houses the laser distance measuring head 205 and a sweeping unit 210. The pivot mechanism 220 is coupled to the mount 215 via a shaft of the pivot mechanism 220, such that a rotary motion of the pivot mechanism 220 results in a similar rotary motion of the mount 215. The mount 215 is depicted as an inverted L-shaped mount, wherein the shaft of the pivot mechanism 220 is coupled to the vertical portion of mount 215. Further, the sweeping unit 210, depicted as the sweeping unit 110 in FIG. 1, is coupled to the horizontal portion of the inverted L-shaped mount 215. The sweeping unit 210 comprises a rotary mechanism (not shown) coupled to the laser distance measuring head 205 via a shaft 240 at one end, such that a stepwise rotary motion of the rotary mechanism 145 results in a corresponding rotation of the laser distance measuring head 205 about an axis of rotation 245 along a semi circular path. The other end of the rotary mechanism 145 is coupled to the mount 215.

As illustrated in FIG. 2, the axis of rotation 245 of the laser distance measuring head 205 is parallel to a plane of a surface of a target object (not shown), for example a cubical box. The pivot mechanism 220 is further operable to rotate the mount 215 such that an axis of rotation 250 of the laser distance measuring head 205 is perpendicular to the plane of the surface of the target object, as shown in FIG. 2.

One skilled in the art will recognize that FIG. 2 is a simplified representation of the device 200 for purposes of explanation and is not intended to limit the scope of the subject matter in any way. In this regard, although FIG. 2 illustrates the device 200 comprising the handle 235 for a handheld operation, however, in practice, the device 200 may also be implemented in other types of housings such as a desktop workstation or a stationary reader.

Figure 3:
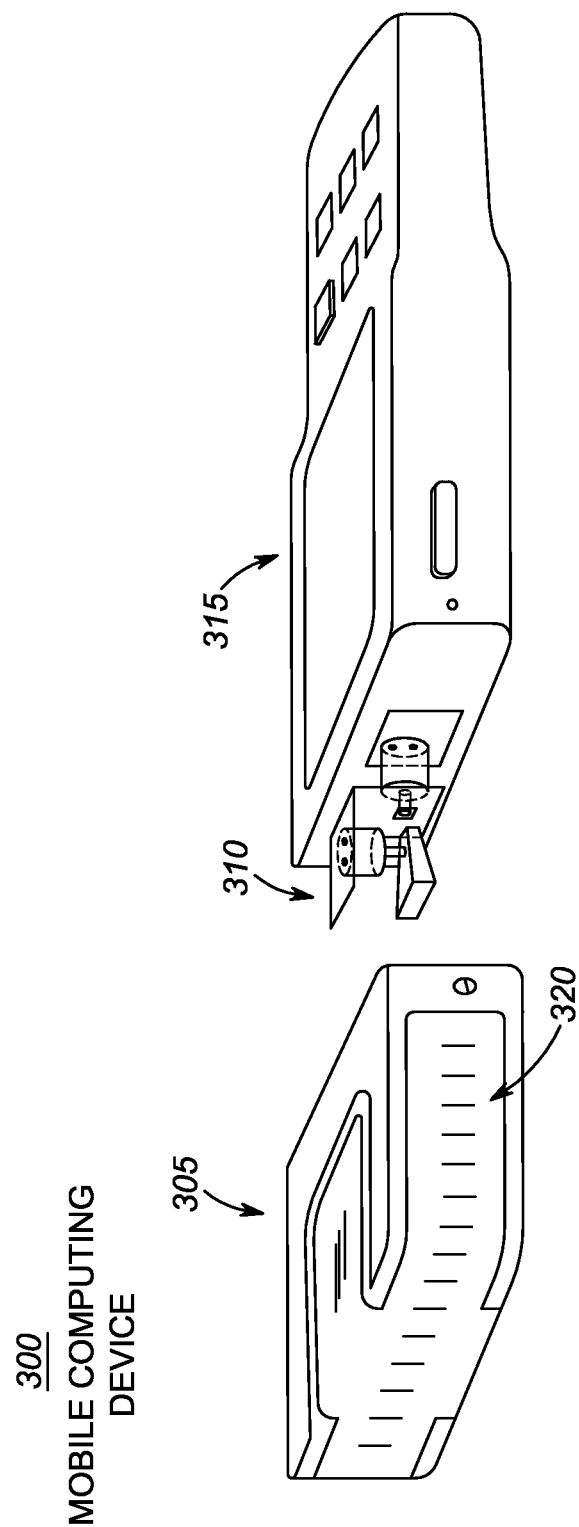
FIG. 3 is a pictorial view of the scanning apparatus of FIG. 1 incorporated in a mobile computing device in accordance with some embodiments.

FIG. 3 illustrates a mobile computing device 300 for identifying an edge of a target object in accordance with some embodiments. The mobile computing device 300 comprises a scanning apparatus 310, which corresponds to the scanning apparatus 100 as shown in FIG. 1. In one embodiment as shown in FIG. 3, the scanning apparatus 310 is mounted on the top portion of a handset 315 and is covered by a cover 305. The cover 305 comprises an exit window 320 in the housing of the cover 305 that facilitates the scan beam generated by the scanning apparatus 310 to pass through to impinge on, and sweep across, a target object located in a range of working distances from the housing.

Thus, as shown in FIG. 3, the scanning apparatus 310 for identifying an edge of a target object may be coupled as an accessory to any mobile computing device 300, such as a conventional laser scanner, to enhance the functionality of the mobile computing device 300, specifically to provide edge detection and dimension measurement functionality to the mobile computing device 300.

Figure 4:
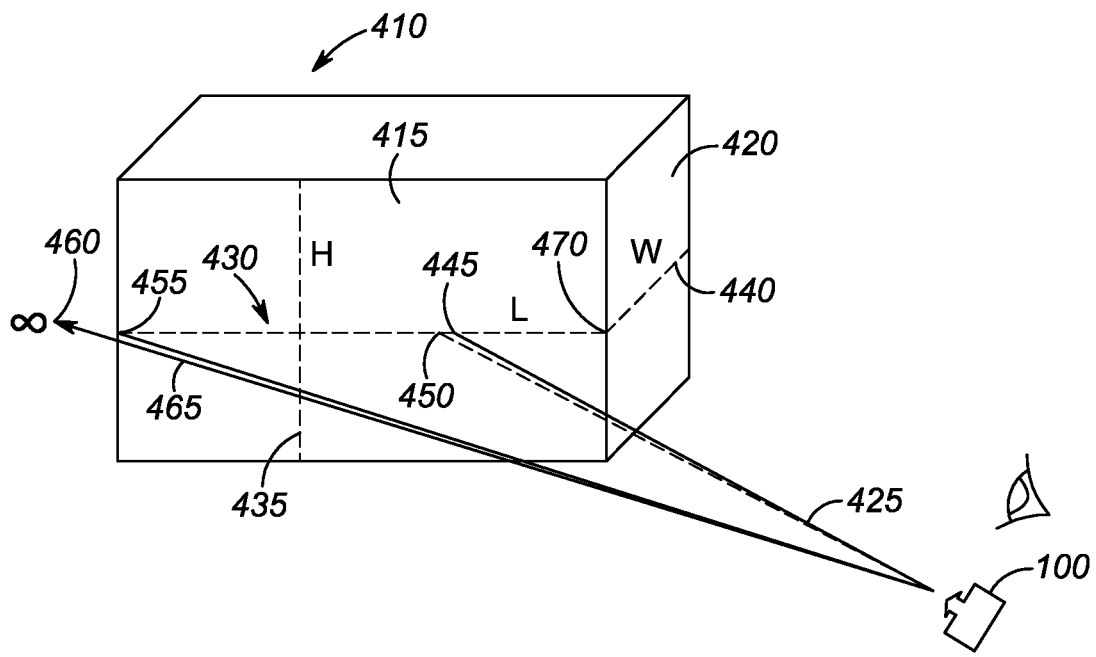
FIG. 4 illustrates multiple surfaces of a target object being scanned during an operation of the scanning apparatus of FIG. 1 in accordance with some embodiments.

FIG. 4 illustrates multiple surfaces of an exemplary target object being scanned during an operation of the scanning apparatus of FIG. 1 in accordance with some embodiments. As shown in FIG. 4, the scanning apparatus 100 is positioned to scan a target object 410. The target object 410 can have a plurality of surfaces (or faces), wherein FIG. 4 depicts at least two surfaces of the target object 410, a first surface 415 and an adjacent second surface 420.

When the scanning apparatus 100 is triggered, either automatically or manually, to scan the target object 410 to at least identify an edge of the target object 410, the scanning apparatus 100 generates and directs a scan beam 425 onto the first surface 415 of the target object 410 at a point of incidence 445, as shown in FIG. 4. The scanning apparatus 100 then determines a first measured distance between the laser distance measuring head 105 (as shown in FIG. 1) and the point of incidence 445 on the target object. Further, the scanning apparatus 100 rotates the laser distance measuring head 105 by a predetermined angle (for example, by one (1) degree) in a first direction, such as, in a counter-clockwise direction. The scanning apparatus 100 again generates and directs the scan beam onto the target object 410 at a point of incidence 450, and determines a second measured distance between the laser distance measuring head 105 and the point of incidence 450. The scanning apparatus 100 then compares a difference between the first measured distance and the second measured distance to a predetermined threshold value, to identify any abrupt change in measured distance. As shown in FIG. 4, the point of incidence 445 and the point of incidence 450 are proximate to each other on the first surface 415 of the target object 410, which implies that the corresponding distances measured from the points of incidences 445 and 450 to the laser distance measuring head 105 are almost equal with a minor deviation. Hence, the difference between the measured distance from the points of incidence 445 and 450 to the laser distance measuring head 105 does not exceed the predetermined threshold value. Thus, the scanning apparatus 100 determines that an edge of the target object 410 is not yet reached. The scanning apparatus 100, in response to the determination, further rotates the laser distance measuring head 105 by the predetermined angle in the first direction, and repeats the steps of directing the scan beam at a point of incidence onto the target object 410, determining a measured distance corresponding to the point of incidence, and comparing a difference between the measured distances corresponding to two consecutive steps of rotation to the predetermined threshold value.

It should be noted that when the axis of rotation of the laser distance measuring head 105 is held parallel to the plane of the first surface 415 of the target object 410, the rotary motion of the laser distance measuring head 105 results in a linear sweeping pattern of the scan beam 425 across the first surface 415 of the target object 410. The linear sweeping pattern of the scan beam 425 is depicted by a dashed line 430 in FIG. 4.

Thus, as illustrated in FIG. 4, the scanning apparatus 100 continues to scan the first surface 415 of the target object 410 along the linear sweeping pattern of the scan beam by rotating the laser distance measuring head 105 in predetermined steps of rotation. At a point of incidence 455 of the scan beam as depicted in FIG. 4, the scanning apparatus 100 determines a measured distance between the laser distance measuring head 105 and the point of incidence 455. On comparing a difference between the current measured distance and a measured distance corresponding to a preceding step of rotation (not shown), the scanning apparatus 100 determines that the difference is less than the predetermined threshold value. Hence, the scanning apparatus 100 further rotates the laser distance measuring head 105 by the predetermined angle in the first direction. In response to the rotation, a scan beam 465 directed towards the target object 410, instead of hitting a surface of the target object 410, passes by an edge of the target object 410 onto free space, as shown in FIG. 4. The scan beam 465, on missing the target object, may get reflected from other objects present around or behind the target object 410. The scanning apparatus 100 determines a measured distance between the laser distance measuring head 105 and a point of incidence 460 corresponding to the current step of rotation. Since the scan beam 465 corresponding to the current step of rotation, passes by the edge of the target object 410 onto free space/other objects, this causes an abrupt change in the measured distance pattern. On comparing a difference between the measured distance corresponding to the current step of rotation and the measured distance corresponding to the preceding step of rotation i.e., corresponding to the point of incidence 455, the scanning apparatus 100 determines that the difference exceeds the predetermined threshold value. This implies that an edge of the target object 410 has occurred corresponding to the preceding step of rotation. Thus, the scanning apparatus 100 identifies a first edge of the target object 410 at the point of incidence 455 of the scan beam corresponding to the preceding step of rotation.

The scanning apparatus 100 may further be used to measure dimensions of the target object, such as, for measuring dimensions (length, width, height, volume, etc.) of a box, calculating surface area of a wall, and the like. For this, the scanning apparatus 100 may further operate to identify a second edge of the target object. For example, to measure a length (L) of the target object 410, the scanning apparatus 100 on identifying the first edge of the target object 410, stores the measured distance corresponding to the first edge (i.e. at the point of incidence 455) as a first measured distance 'a'. On detecting the first edge of the target object 410, the rotary mechanism 145 (as shown in FIG. 1) operates to rotate the laser distance measuring head 105 in intervals of the predetermined angle (for example, one (1) degree) in a second direction (for example in a clockwise direction), wherein the second direction is opposite to the first direction. The scanning apparatus 100 continues to rotate the laser distance measuring head 105 in intervals of the predetermined angle, and repeats the process for identifying an edge as described above, in the second direction, until a second edge (i.e. point of incidence 470) of the target object 410 is identified. On detecting the second edge of the target object 410, the scanning apparatus 100 stores the measured distance corresponding to the second edge of the target object 410 as a second measured distance V.

Further, as the laser distance measuring head 105 is rotated in intervals of the predetermined angle (for example, in one (1) degree intervals), the scanning apparatus 100 is operable to determine an angle of rotation 'α' (see FIGS. 5-7) of the laser distance measuring head 105 between the first edge (i.e. point of incidence 455) and the second edge (i.e. point of incidence 470) of the target object 410. That is, the scanning apparatus 100 on identifying the first edge, starts rotating the laser distance measuring head 105 in the opposite direction, and keeps a track of total angular motion of the laser distance measuring head 105 as a function of the predetermined angle. For example, if the second edge is identified after thirty steps of rotation of the laser distance measuring head 105, then the scanning apparatus 100 determines the angle of rotation 'α' of the laser distance measuring head 105 between the first edge and the second edge as thirty (30) degrees for one (1) degree intervals, or sixty (60) degrees for two (2) degree intervals, and the like. Thus, the angle of rotation 'α' is computed as a function of the number of steps of rotation between the first edge and the second edge and the predetermined angle of rotation.

Thus, to compute the length (L) of the target object 410, the scanning apparatus 100 determines the first measured distance 'a' corresponding to the first edge, the second measured distance 'b' corresponding to the second edge, and the angle of rotation 'α' of the laser distance measuring head 105 between the first edge and the second edge. The scanning apparatus 100 determines the length (L) of the target object 410 using the cosine rule, that is, a mathematical equation:

$$L^2 = a^2 + b^2 - 2ab \cos \alpha.$$

Similarly, the scanning apparatus 100 may be used to scan the second surface 420 of the target object 410 to identify two edges of the target object 410 and further compute a width (W) of the target object 410. To identify the two edges of the second surface 420 of the target object 410, the scan beam sweeps along a dashed line 440 as shown in FIG. 4. On detecting the two edges and the corresponding measured distances ('a' and 'b'), the scanning apparatus 100 further determines the angle of rotation 'α' of the laser distance measuring head 105 between the two edges, as described above. The scanning apparatus 100 determines the width (W) of the target object 410 using the cosine rule, that is, a mathematical equation:

$$W^2 = a^2 + b^2 - 2ab \cos \alpha.$$

To determine a height (H) of the target object 410, the pivot mechanism 115 (as shown in FIG. 1) is operable to rotate the mount that houses the laser distance measuring head 105 and the sweeping unit 110 (as shown in FIG. 1), such that an axis of the rotation of the laser distance measuring head 105 is perpendicular to the plane of the first surface 415 of the target object 410. For example, when the mount is rotated by ninety (90) degrees, it results in the laser distance measuring head 105 rotating along a semi-circular path along a horizontal axis of rotation, such that the rotary motion of the laser distance measuring head 105 results in a linear sweeping pattern of the scan beam across the first surface 415 of the target object 410 along the dashed line 435 as shown in FIG. 4. Thus, as described above, the scanning apparatus 100 may be used to scan the first surface 415 of the target object 410 along dashed line 435 to identify two edges of the target object 410. On detecting the two edges and the corresponding measured distances ('a' and 'b'), the scanning apparatus 100 further determines the angle of rotation 'α' of the laser distance measuring head 105 between the two edges. The scanning apparatus 100 determines the height (H) of the target object 410 using the cosine rule, that is, a mathematical equation:

$$H^2 = a^2 + b^2 - 2ab \cos \alpha.$$

Further, the scanning apparatus 100 may also be used to calculate other parameters related to the target object 410, such as an area (A), a surface area ($A_s$), a volume (V), etc., based on the determined length (L), height (H), and width (W) of the target object 410. As known in the art, calculation of dimensions and other related parameters (area, surface area, volume etc.) of an object is a function of the shape of the object. Accordingly, the scanning apparatus 100 firstly identifies the shape of the target object 410 (for example, in response to a user input). Then, the scanning apparatus 100 determines a corresponding algorithm for computing dimensions (length (L), height (H), and width (W), area, surface area, volume etc.) of the target object 410. This is further explained with reference to FIGS. 5-7.

Figure 5:
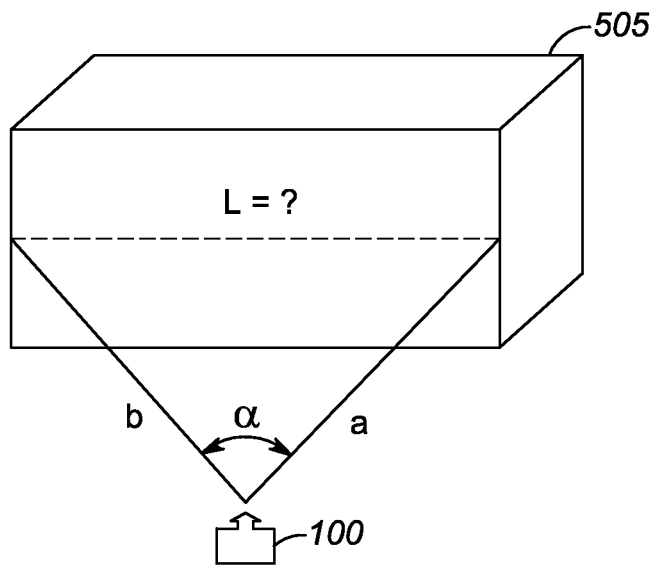
FIG. 5 illustrates a target object of cubical/cuboidal shape being scanned during an operation of the scanning apparatus of FIG. 1 in accordance with some embodiments.
Figure 6:
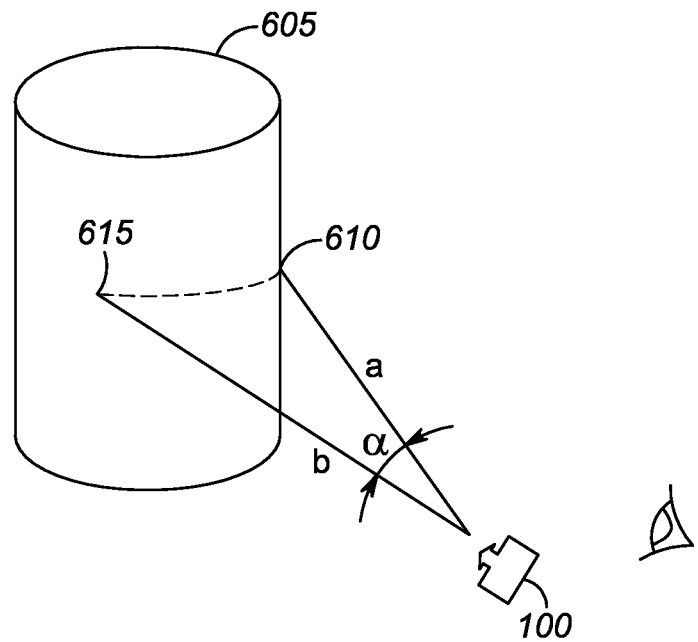
FIG. 6 illustrates a target object of cylindrical shape being scanned during an operation of the scanning apparatus of FIG. 1 in accordance with some embodiments.
Figure 7:
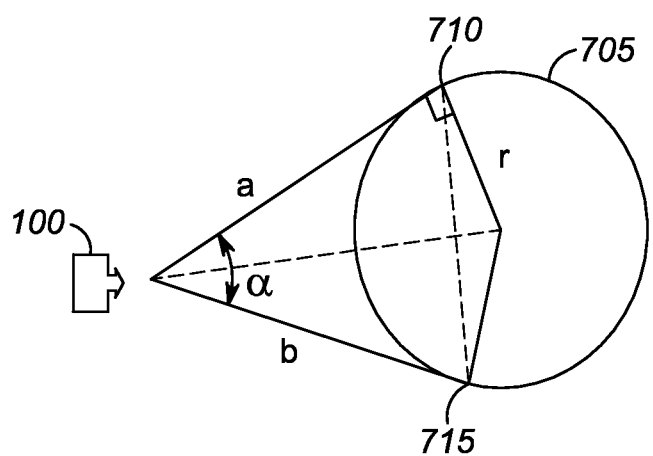
FIG. 7 illustrates a target object of circular/spherical shape being scanned during an operation of the scanning apparatus of FIG. 1 in accordance with some embodiments.

FIGS. 5, 6, and 7 illustrate target objects of different shapes being scanned during an operation of the scanning apparatus of FIG. 1 in accordance with some embodiments. Specifically, FIG. 5 illustrates a cubical/cuboidal target object 505, FIG. 6 illustrates a cylindrical target object 605, and FIG. 7 illustrates a circular or spherical target object 705 being scanned by the scanning apparatus 100. In one embodiment, the scanning apparatus 100 is operating to identify edges and measure dimensions of the targets objects 505, 605, and 705, as shown in FIGS. 5-7. For this, the scanning apparatus 100 identifies a shape of the target object. As mentioned earlier, a user of the scanning apparatus 100 may provide an input identifying the shape of the target object. Alternatively, the scanning apparatus 100 may automatically identify the shape of the target object. Based on the identified shape, the scanning apparatus 100 determines a corresponding algorithm for computing dimensions (length (L), height (H), width (W), radius (R), area, surface area, volume etc.) of the target object.

Further, the scanning apparatus 100 may operate in different modes of operation, such as a linear dimension calculating mode, an area calculating mode, and a volume calculating mode. In a linear dimension calculating mode, the scanning apparatus 100 operates to compute at least one of the length (L), the height (H), the width (W), the radius (R), and a diameter of the target object. In an area calculating mode, the scanning apparatus 100 operates to compute an area of a two-dimensional target object and a surface area of a three-dimensional target object as a function of at least one of the length (L), the height (H), the width (W), the radius (R), and a diameter of the target object. In a volume calculating mode, the scanning apparatus 100 operates to compute a volume of the target object as a function of at least one of the length (L), the height (H), the width (W), the radius (R), and a diameter of the target object. In alternate embodiments, the scanning apparatus 100 may operate in other modes of operation, such as a box volume calculation mode, a face length/height/area calculation mode, a room dimensioning mode, a room area calculation mode, a cylinder radius/diameter/volume calculation mode, a pipe radius/diameter calculation mode, etc. It should be noted that the scanning apparatus 100, as described herein, is operable to determine one or more dimensions (such as the length, height, radius, etc.) of the target object, as required, automatically, without any user intervention. For example, when the user selects the box volume calculation mode, the scanning apparatus 100 automatically measures the length, height, and width of the box and displays the calculated volume based on the measured dimensions (length, height, and width).

FIG. 5 illustrates a target object 505 of a cubical/cuboidal shape being scanned during an operation of the scanning apparatus 100 in accordance with some embodiments. The scanning apparatus 100 firstly determines a shape of the target object 505, that is, cubical or cuboidal. Further, based on the mode of operation, the scanning apparatus 100 determines corresponding algorithms for computing various dimensions of the target object 505. In linear dimension calculating mode, the scanning apparatus 100 determines at least one of the length (L), the height (H), the width (W), as already described with reference to FIG. 4. In area calculating mode, the scanning apparatus 100 computes a surface area ($A_s$) of the target object 505, using the mathematical equation:

$$A_s = 6L^2,$$

when the shape of the target object 505 is cubical;

$$A_s = 2(LH + HW + WL),$$

when the shape of the target object 505 is cuboidal.

In volume calculating mode, the scanning apparatus 100 computes a volume (V) of the target object 505, using the mathematical equation:

$$V=L^3,$$

when the shape of the target object 505 is cubical;

$$V=LHW,$$

when the shape of the target object 505 is cuboidal;

FIG. 6 illustrates a target object 605 of cylindrical shape being scanned during an operation of the scanning apparatus 100 in accordance with some embodiments. Thus, the scanning apparatus 100 firstly determines a shape of the target object 605, that is, cylindrical. Further, based on the mode of operation, the scanning apparatus 100 determines corresponding algorithms for computing various dimensions of the target object 605. In linear dimension calculating mode, the scanning apparatus 100 determines at least one of the radius (R), the diameter, and the height (H) of the target object 605. To determine the radius (R), the scanning apparatus 100 measures lengths ('a' and 'b') of two tangents to the target object 605, wherein the two tangent points 610 and 615 on the target object 605 are identified similar to identifying two edges of a target object as described with reference to FIG. 4. On determining the lengths 'a' and 'b' and an angle 'α' between the two tangents, the scanning apparatus 100 computes the radius (R) of the target object 605 using a mathematical equation:

$$R = a \tan \alpha/2.$$

In area calculating mode, the scanning apparatus 100 computes a surface area ($A_s$) of the target object 605, using the mathematical equation:

$$A_s=6.28R(R+H).$$

In volume calculating mode, the scanning apparatus 100 computes a volume (V) of the target object 605, using the mathematical equation:

$$V=3.14R^2H.$$

FIG. 7 illustrates a target object 705 of circular/spherical shape being scanned during an operation of the scanning apparatus 100 in accordance with some embodiments. The scanning apparatus 100 determines a shape of the target object 705, that is, circular or spherical. Further, based on the mode of operation, the scanning apparatus 100 determines corresponding algorithms for computing various dimensions of the target object 705. In linear dimension calculating mode, the scanning apparatus 100 determines at least one of the radius (R) and the diameter of the target object 705. To determine the radius (R), the scanning apparatus 100 measures lengths ('a' and 'b') of two tangents to the target object 705, wherein the two tangent points 710 and 715 on the target object 705 are determined similar to identifying two edges of a target object as described with reference to FIG. 4. On determining the lengths 'a' and 'b' and an angle 'α' between the two tangents, the scanning apparatus 100 computes the radius (R) of the target object 705 using a mathematical equation:

$$R = a \tan \alpha/2.$$

In area calculating mode, the scanning apparatus 100 computes an area (A) or a surface area ($A_s$) of the target object 705, using the mathematical equation:

$$A=3.14R^2,$$

when the shape of the target object 705 is circular;

$$A_s=12.56R^2,$$

when the shape of the target object 705 is spherical.

In volume calculating mode, the scanning apparatus 100 computes a volume (V) of the target object 705, using the mathematical equation:

$$V=4.186R^3,$$

when the shape of the target object 705 is spherical.

Further, although FIGS. 5, 6, and 7 depict a few exemplary shapes of target objects, however it should be understood that the method and apparatus described herein is capable of measuring dimensions of target objects of other shapes as well. As an example, listed below are the mathematical equations for determining dimensions of target objects of other shapes:

when the shape of the target object is a square, area (A) is computed by:

$$A=L^2;$$

when the shape of the target object is rectangular, area (A) is computed by:

$$A=LH;$$

when the shape of the target object is conical, surface area ($A_s$) is computed by:

$$A_s=3.14R(a+R),$$

and volume (V) is computed by:

$$V=1.046R^2H.$$

One skilled in the art will recognize that the mathematical equations mentioned above are for purposes of explanation and are not intended to limit the scope of the subject matter in any way. In this regard, although the description herein mentions certain mathematical equations for computing various dimensions, however, in practice, the scanning apparatus 100 may be operable to use any suitable algorithm or mathematical equation for such computation.

Figure 8A:
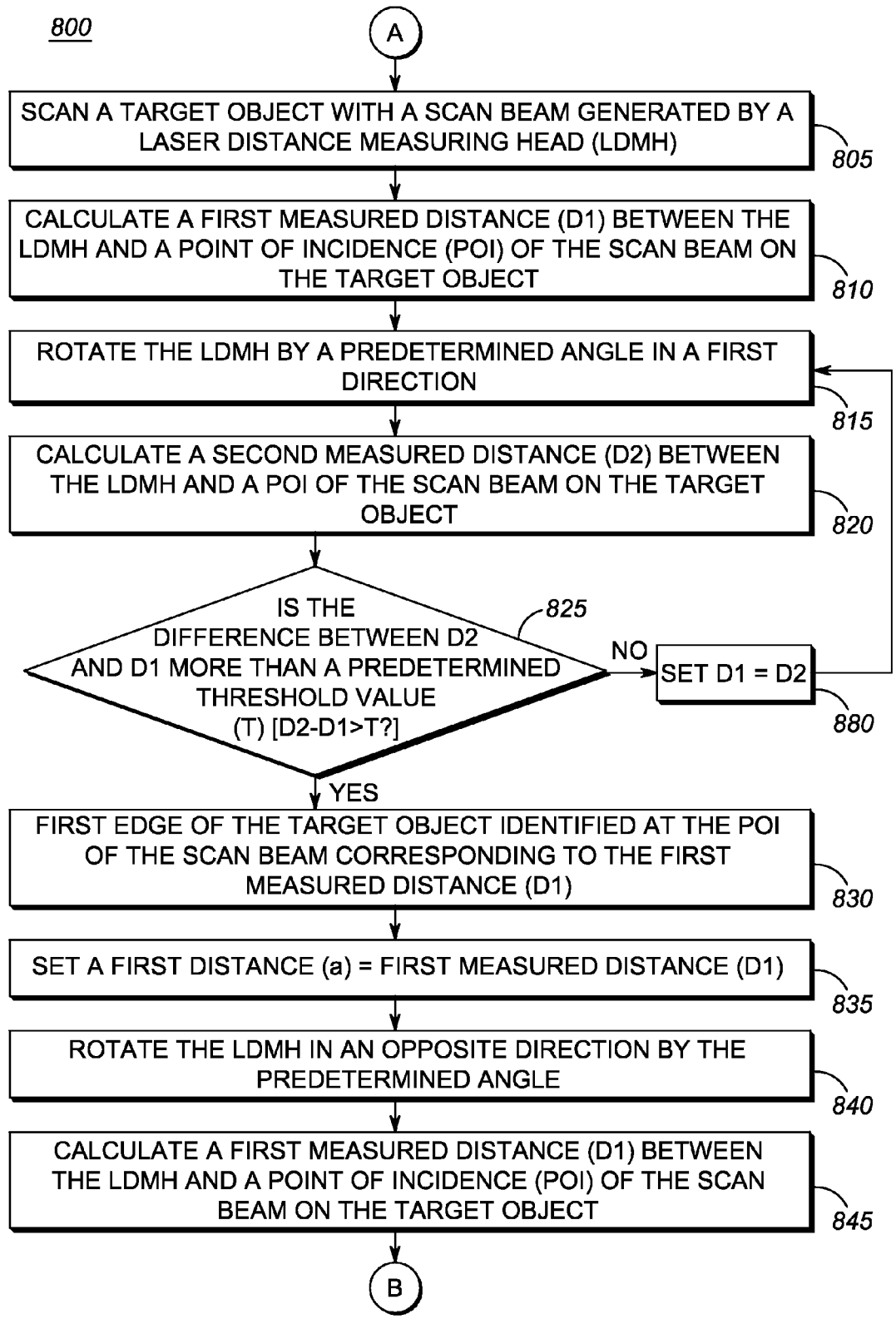
FIG. 8A and FIG. 8B illustrate a flowchart of a method of operation of a scanning apparatus for identifying an edge of a target object in accordance with some embodiments.
Figure 8B:
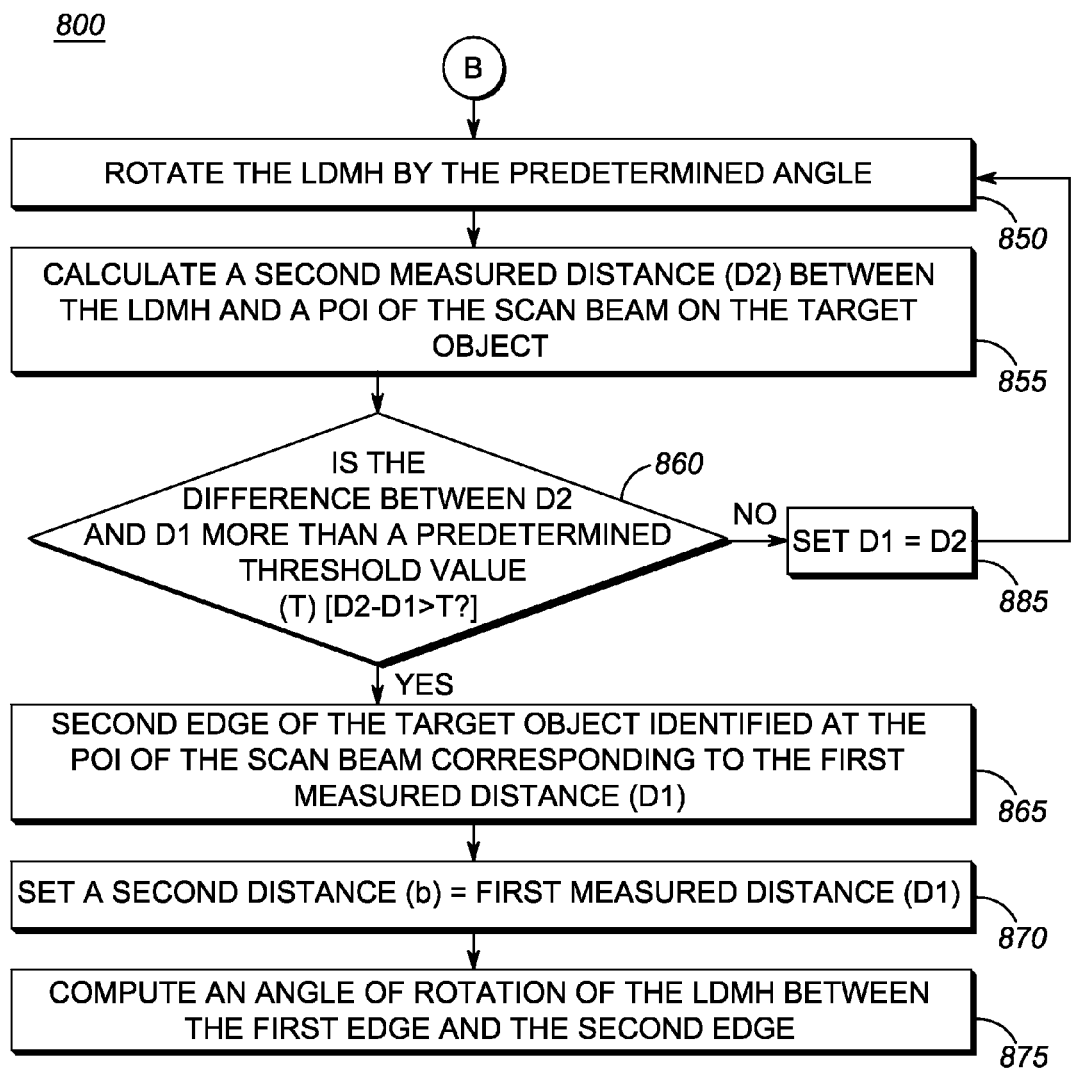

FIG. 8A and FIG. 8B illustrate a flowchart of a method 800 of operating the scanning apparatus 100 for identifying an edge of a target object in accordance with some embodiments. The method 800 is initiated at block 805 as shown in FIG. 8A, when the laser distance measuring head 105 generates a scan beam and directs the scan beam onto the target object at a point of incidence. In one embodiment, the laser distance measuring head 105 generates the scan beam in response to a user input. In an alternative embodiment, the scan beam is generated in response to an automatic trigger. Further, at block 810, based on a reflected and/or scattered scan beam received at the laser distance measuring head 105, the scanning apparatus 100 calculates a first measured distance (D1) between the laser distance measuring head 105 and the point of incidence of the scan beam on the target object. At block 815, the scanning apparatus 100 rotates the laser distance measuring head 105 by a predetermined angle in a first direction. For example, the laser distance measuring head 105 is rotated by one (1) degree in a counter-clockwise direction. In response to the rotation, the laser distance measuring head 105 again generates a scan beam and directs the scan beam onto the target object at a point of incidence. Further, at block 820, the scanning apparatus 100 calculates a second measured distance (D2) between the laser distance measuring head 105 and the point of incidence of the scan beam on the target object.

At block 825, the scanning apparatus 100 determines when the difference between the first measured distance (D1) and the second measured distance (D2) is more than a predetermined threshold value (T). When the difference is less than the predetermined threshold value (T), the method 800 proceeds to block 880. At block 880, the scanning apparatus 100 sets a value of the second measured distance (D2) to the first measured distance (D1), such that a memory buffer of the scanning apparatus 100 retains the value of the second measured distance (D2) by overwriting it over the stored first measured distance (D1) value. The method 800 then returns to block 815, such that the scanning apparatus 100 further rotates the laser distance measuring head 105 by the predetermined angle in the first direction and repeats the steps of method 800 as illustrated in blocks 815, 820 and 825 of the method 800 to calculate a second measured distance (D2), until the difference between the first measured distance (D1) and the second measured distance (D2) exceeds the predetermined threshold value (T).

At block 825, when the difference between the first measured distance (D1) and the second measured distance (D2) exceeds the predetermined threshold value (T), then the method 800 proceeds to block 830. At block 830, the scanning apparatus 100 identifies that a first edge of the target object has occurred at the point of incidence of the scan beam corresponding to first measured distance (D1) at the preceding step of rotation. In response to identifying the first edge of the target object, at block 835, the scanning apparatus 100 stores the value of the first measured distance (D1) as a first distance (a). Thus, the first distance (a) is the distance between the laser distance measuring head 105 and the first edge of the target object.

At block 840, the scanning apparatus 100 rotates the laser distance measuring head 105 by the predetermined angle in a second direction opposite to the first direction. For example, the laser distance measuring head 105 is rotated by one (1) degree in a clockwise direction. Further, in blocks 845, 850, 855, 860, and 885, as shown in FIG. 8A and FIG. 8B, the scanning apparatus 100 repeats the steps of the method 800 as described above until a second edge of the target object is identified at block 865, similar to identifying the first edge of the target object as described earlier. At block 870, the scanning apparatus 100 stores the value of the first measured distance (D1) as a second distance (b). The second distance (b) is the distance between the laser distance measuring head 105 and the second edge of the target object. At block 875, the scanning apparatus 100 further computes an angle of rotation ('α') of the laser distance measuring head 105 between the first edge and the second edge. As described earlier, the angle of rotation 'α' is computed as a function of the number of steps of rotation of the laser distance measuring head 105 between the first edge and the second edge and the predetermined angle of rotation. For example, when the second edge is identified after thirty steps of rotation of the laser distance measuring head 105, then the scanning apparatus 100 determines the angle of rotation 'a' of the laser distance measuring head 105 between the first edge and the second edge as thirty (30) degrees for one (1) degree intervals.

Thus, the method 800 enables the scanning apparatus 100 to identify one or more edges of the target object and further determine values such as the first distance 'a', the second distance 'b' the angle of rotation 'α' for further computation of dimensions (such as length, width, height, area, etc.) of the target object.

Figure 9A:
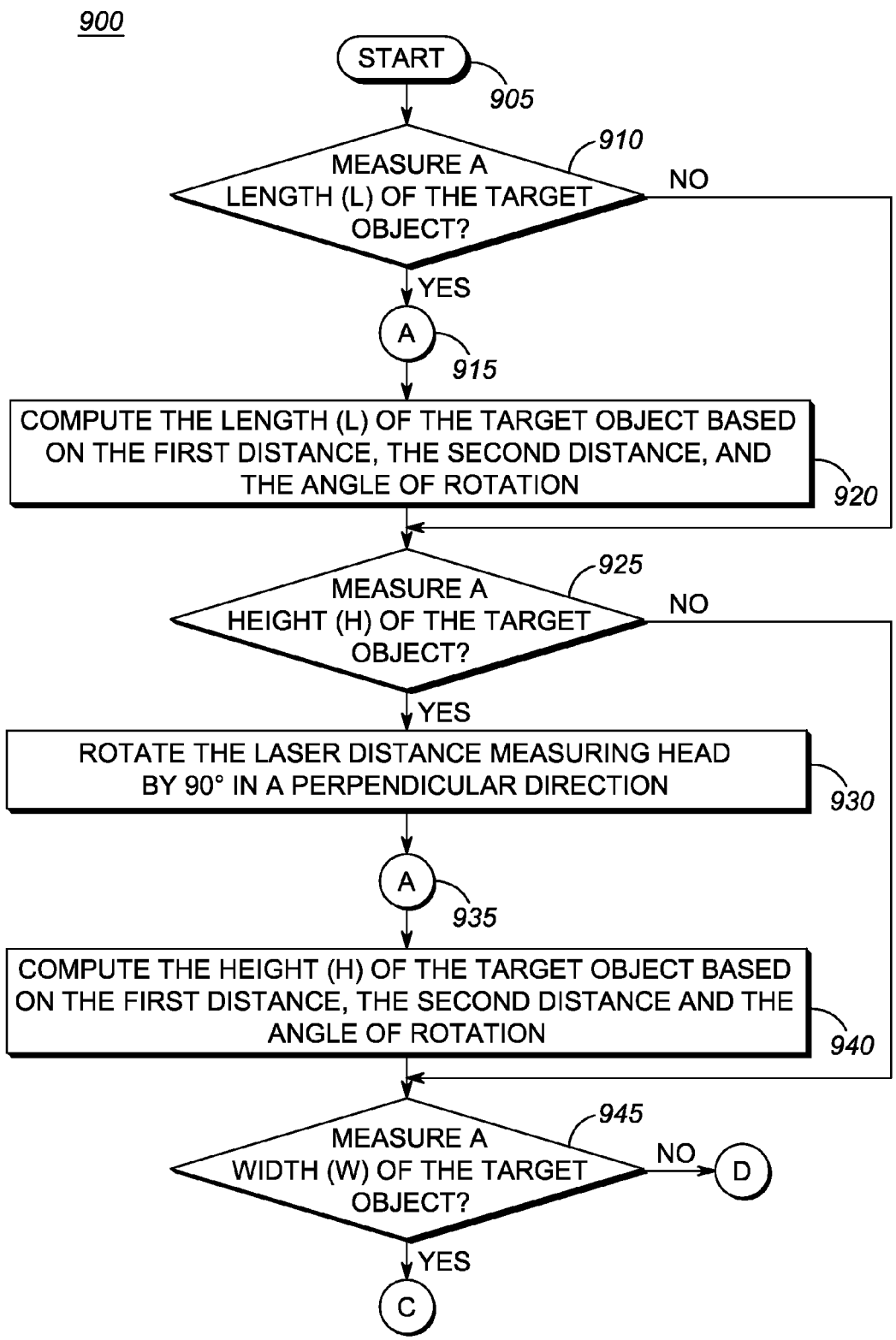
FIG. 9A and FIG. 9B illustrate a flowchart of a method of operation of a scanning apparatus for measuring dimensions of a target object in accordance with some embodiments.
Figure 9B:
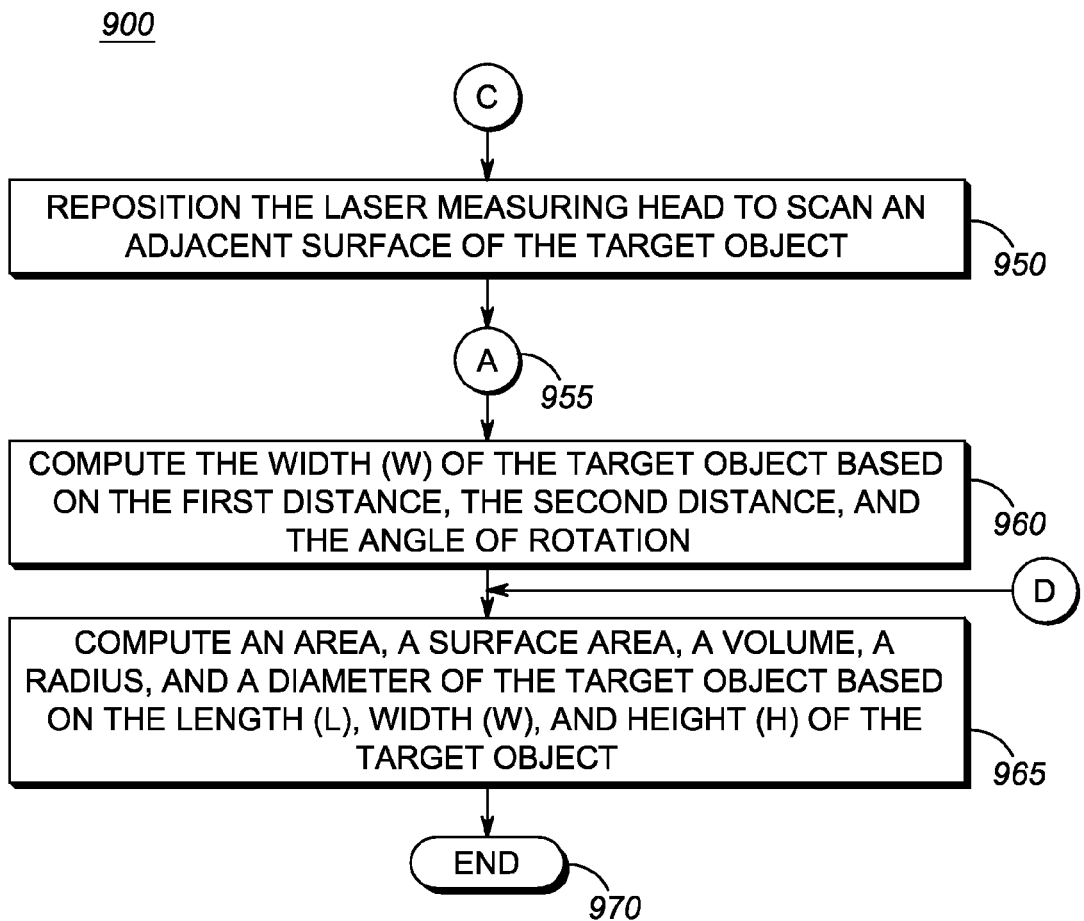

FIG. 9A and FIG. 9B illustrate a flowchart of a method 900 of operating the scanning apparatus 100 for measuring dimensions of a target object in accordance with some embodiments. The method 900 starts at block 905, as shown in FIG. 9A. At block 910, the scanning apparatus 100 determines a length (L) of the target object is required to be measured or not. In one embodiment, the scanning apparatus 100 determines whether to measure the length (L) based on the operating mode of the scanning apparatus 100, such as the linear dimension calculating mode, the area calculating mode, and the volume calculating mode, as described earlier. In alternate embodiments, a user of the scanning apparatus 100 may provide an input to specify whether to measure the length (L) of the target object or not. At block 910, when the scanning apparatus 100 determines that the length (L) of the target object has to be measured, then the method 900 proceeds to block 915. At block 915, the scanning apparatus 100 executes the method 800 (indicated as flowchart A) as depicted in FIG. 8A and FIG. 8B to measure the first distance 'a', the second distance 'b', the angle of rotation 'α', as described above, for computation of the length (L) of the target object. At block 920, the scanning apparatus 100 determines the length (L) of the target object using the cosine rule, that is, the mathematical equation, as described earlier:

$$L^2 = a^2 + b^2 - 2ab \cos \alpha.$$

At block 910, when the scanning apparatus 100 determines that the length (L) of the target object is not to be measured, then the method 900 proceeds to block 925. At block 925, the scanning apparatus 100 determines whether to measure a height (H) of the target object. As described above, the scanning apparatus 100 may determine whether to measure the height (H) based on the operating mode, or a user may provide an input to specify whether to measure the height (H) of the target object or not. At block 925, when the scanning apparatus 100 determines that the height (H) of the target object has to be measured, then the method 900 proceeds to block 930. At block 930, the pivot mechanism 115 (as shown in FIG. 1) rotates the laser distance measuring head 105 such that the axis of rotation of the laser distance measuring head 105 is perpendicular to the plane of the surface of the target object. For example, the laser distance measuring head 105 is rotated by ninety (90) degrees in a perpendicular direction. After rotating the laser distance measuring head 105, at block 935, the scanning apparatus 100 executes the method 800 (indicated as flowchart A) as depicted in FIG. 8A and FIG. 8B to measure the first distance 'a', the second distance 'b', the angle of rotation 'α', as described above, for computation of the height (H) of the target object. At block 940, the scanning apparatus 100 determines the height (H) of the target object using the cosine rule, that is, the mathematical equation, as described earlier:

$$H^2 = a^2 + b^2 - 2ab \cos \alpha.$$

At block 925, when the scanning apparatus 100 determines that the height (H) of the target object is not to be measured, then the method 900 proceeds to block 945. At block 945, the scanning apparatus 100 determines whether to measure a width (W) of the target object. As described above, the scanning apparatus 100 may determine whether to measure the width (W) based on the operating mode, or a user may provide an input to specify whether to measure the width (W) of the target object or not. At block 945, when the scanning apparatus 100 determines that the width (W) of the target object has to be measured, then the method 900 proceeds to block 950, as shown in FIG. 9B. At block 950, the scanning apparatus 100 is repositioned (if required) to scan a second surface of the target object, wherein the second surface is adjacent to the surface scanned for measurement of the length (L) of the target object. Further, the pivot mechanism 115 ensures that the axis of rotation of the laser distance measuring head 105 is parallel to the plane of the second surface of the target object. After repositioning the scanning apparatus 100 as required, the method proceeds to block 955, wherein the scanning apparatus 100 executes the method 800 (indicated as flowchart A) as depicted in FIG. 8A and FIG. 8B to measure the first distance 'a', the second distance 'b', the angle of rotation 'α', as described above, for computation of the width (W) of the target object. At block 960, the scanning apparatus 100 determines the width (W) of the target object using the cosine rule, that is, the mathematical equation, as described earlier:

$$W^2 = a^2 + b^2 - 2ab \cos \alpha.$$

The method 900 then proceeds to block 965 for computing other parameters (such as an area, a surface area, a volume, and the like) of the target object based on the determined dimensions (at least one of the length, the width, and the height), as described previously. Thus, the method 900 ends at block 970 with the scanning apparatus 100 determining various dimensions of the target object as required by the user of the scanning apparatus 100.

Accordingly, as described above with reference to FIGS. 1-9, the implementation of the embodiments of the present disclosure results in a scanning apparatus that can be used to identify edges of a target object without user intervention. The scanning apparatus is further capable of measuring dimensions of the target object, and therefore can be used in a variety of applications. For example, the scanning apparatus can be used to determine a volume of a box, a surface area of a wall to determine an amount of paint required to paint the wall, and the like. The scanning apparatus operates to scan and measure dimensions of the target object within a span of a few seconds. Thus, even when the scanning apparatus is used as a handheld device, an accidental movement of a hand of the user holding the scanning apparatus would not affect the measurement of dimensions of the target object. Further, as described previously, conventional laser distance-measuring scanners require the user to manually aim the scan beam at the target object and then move the scanners so as to sweep the scan beam across the target object to detect an edge or measure a dimension of the target object, which results in readings that are prone to error. The scanning apparatus, as disclosed herein, describes automatic rotation of the laser distance measuring head, thus eliminating the need for manually sweeping the scan beam by the user. This results in quick and accurate measurements.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method to perform the mutual authentication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processor" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for identifying an edge of a target object, the method comprising:
   operating a scanning apparatus to rotate a laser distance measuring head in intervals of a predetermined angle in a first direction, the scanning apparatus comprising: a rotary mechanism configured to rotate the laser distance measuring head; and, a pivot mechanism configured to rotate the rotary mechanism through an angle such that an axis of rotation of the laser distance measuring head is rotated through the angle;
   directing, using the rotary mechanism and the laser distance measuring head, a scan beam onto the target object at a point of incidence at each step of rotation;
   measuring, by the scanning apparatus, a distance between the laser distance measuring head and a point of incidence of the scan beam on the target object at each step of rotation;
   when a difference between a measured distance at a first step of rotation and a measured distance at a second step of rotation exceeds beyond a predetermined threshold value, identifying, by the scanning apparatus, that a first edge of the target object has occurred at a point of incidence of the scan beam corresponding to the second step of rotation, wherein the second step of rotation precedes the first step of rotation; and
   rotating, using the pivot mechanism, the rotary mechanism through the angle to identify another edge of the target object in another direction.

2. The method of claim 1, wherein in response to identifying the first edge of the target object, storing, by the scanning apparatus, a first distance as a function of the measured distance between the laser distance measuring head and the point of incidence of the scan beam on the target object at the second step of rotation.

3. The method of claim 2, further comprising:
   in response to identifying the first edge of the target object, and prior to the rotating, using the pivot mechanism, the rotary mechanism, operating the rotary mechanism to rotate the laser distance measuring head in intervals of the predetermined angle in a second direction, wherein the second direction is opposite to the first direction;
   directing, using the rotary mechanism and the laser distance measuring head, a scan beam onto the target object at a point of incidence at each step of rotation;
   measuring, by the scanning apparatus, a distance between the laser distance measuring head and a point of incidence of the scan beam on the target object at each step of rotation;
   when a difference between a measured distance at a first step of rotation and a measured distance at a second step of rotation exceeds beyond the predetermined threshold value, identifying, by the scanning apparatus, that a second edge of the target object has occurred at a point of incidence of the scan beam corresponding to the second step of rotation, wherein the second step of rotation precedes the first step of rotation;
   storing, by the scanning apparatus, a second distance as a function of the measured distance between the laser distance measuring head and the point of incidence of the scan beam on the target object at the second step of rotation; and
   determining, by the scanning apparatus, an angle of rotation of the laser distance measuring head between the first edge and the second edge.

4. The method of claim 3, further comprising:
   when the laser distance measuring head is positioned to scan a first surface of the target object,
   determining, by the scanning apparatus, a length (L) of the target object as a function of the first distance, the second distance, and the angle of rotation of the laser distance measuring head, when an axis of the rotation of the laser distance measuring head is parallel to a plane of the first surface of the target object;
   rotating, using the pivot mechanism, the rotary mechanism through a given angle to measure a height (H) of the target object using the rotary mechanism and the laser distance measuring head at the given angle; and
   determining, by the scanning apparatus, the height (H) of the target object as a function of the first distance, the second distance, and the angle of rotation of the laser distance measuring head, when an axis of the rotation of the laser distance measuring head is perpendicular to a plane of the first surface of the target object.

5. The method of claim 4, further comprising:
   rotating, using the pivot mechanism, the rotary mechanism to position the laser distance measuring head to scan a second surface of the target object,
   determining, by the scanning apparatus, a width (W) of the target object as a function of the first distance, the second distance, and the angle of rotation of the laser distance measuring head, when an axis of the rotation of the laser distance measuring head is parallel to a plane of the second surface of the target object.

6. The method of claim 5, wherein:
   the length (L) of the target object is determined by a mathematical equation:

$$L^2 = a^2 + b^2 - 2ab \cos \alpha;$$

the height (H) of the target object is determined by a mathematical equation:

$$H^2 = a^2 + b^2 - 2ab \cos \alpha; \text{ and}$$

the width (W) of the target object is determined by a mathematical equation:

$$W^2 = a^2 + b^2 - 2ab \cos \alpha;$$

wherein a is the first distance, b is the second distance, and α is the angle of rotation of the laser distance measuring head.

7. The method of claim 6, further comprising determining, by the scanning apparatus, an area (A) of a two-dimensional target object as a function of a shape of the target object, the method comprising:
   when the shape of the target object is square, determining the area (A) of the target object by a mathematical equation:

$$A = L^2;$$

when the shape of the target object is rectangular, determining the area (A) of the target object by a mathematical equation:

$A=LH$; and when the shape of the target object is circular, determining the area (A) of the target object by a mathematical equation:

$A=3.14R^2$, wherein a radius (R) of the target object is calculated by a mathematical equation:

$R=a \tan \alpha/2$.

8. The method of claim 6, further comprising determining, by the scanning apparatus, a surface area ($A_s$) of a three-dimensional target object as a function of a shape of the target object, the method comprising:

when the shape of the target object is cubical, determining the surface area ($A_s$) of the target object by a mathematical equation:

$A_s=6L^2$;

when the shape of the target object is cuboidal, determining the surface area ($A_s$) of the target object by a mathematical equation:

$A_s=2(LH+HW+WL)$;

when the shape of the target object is cylindrical, determining the surface area ($A_s$) of the target object by a mathematical equation:

$A_s=6.28R(R+H)$, wherein a radius (R) of the target object is calculated by a mathematical equation:

$R=a \tan \alpha/2$;

when the shape of the target object is conical, determining the surface area ($A_s$) of the target object by a mathematical equation:

$A_s=3.14R(a+R)$, wherein a radius (R) of the target object is calculated by a mathematical equation:

$R=a \tan \alpha/2$; and when the shape of the target object is spherical, determining the surface area ($A_s$) of the target object by a mathematical equation:

$A_s=12.56R^2$, wherein a radius (R) of the target object is calculated by a mathematical equation:

$R=a \tan \alpha/2$.

9. The method of claim 6, further comprising determining, by the scanning apparatus, a volume (V) of a target object as a function of a shape of the target object, the method comprising:

when the shape of the target object is cubical, determining the volume (V) of the target object by a mathematical equation:

$V=L^3$;

when the shape of the target object is cuboidal, determining the volume (V) of the target object by a mathematical equation:

$V=LHW$;

when the shape of the target object is cylindrical, determining the volume (V) of the target object by a mathematical equation:

$V=3.14R^2H$, wherein a radius (R) of the target object is calculated by a mathematical equation:

$R=a \tan \alpha/2$;

when the shape of the target object is conical, determining the volume (V) of the target object by a mathematical equation:

$V=1.046R^2H$, wherein a radius (R) of the target object is calculated by a mathematical equation:

$R=a \tan \alpha/2$; and when the shape of the target object is spherical, determining the volume (V) of the target object by a mathematical equation:

$V=4.186R^3$, wherein a radius (R) of the target object is calculated by a mathematical equation:

$R=a \tan \alpha/2$.

10. A scanning apparatus for identifying an edge of a target object, the scanning apparatus comprising:
a first mount;
a second mount;
a laser distance measuring head;
a sweeping unit comprising a rotary mechanism that is coupled to the second mount at one end and to the laser distance measuring head at the other end;
a pivot mechanism mounted to the first mount at a first side and pivotably coupled to the second mount at a second side opposite the first side, the first mount acting as a fixed support for the pivot mechanism, the pivot mechanism configured to rotate the second mount relative to the first mount to rotate the laser distance measuring head and the sweeping unit, such that an axis of the rotation of the laser distance measuring head is either perpendicular or parallel to a plane of a surface of the target object; and
a processor operatively coupled to the laser distance measuring head and the sweeping unit, the processor operating to:
control the rotary mechanism to rotate the laser distance measuring head in intervals of a predetermined angle in a first direction;
control the laser distance measuring head to direct a scan beam onto the target object at a point of incidence at each step of rotation;
measure a distance between the laser distance measuring head and a point of incidence of the scan beam on the target object at each step of rotation; and
when a difference between a measured distance at a first step of rotation and a measured distance at a second step of rotation exceeds beyond a predetermined threshold value, identify that a first edge of the target object has occurred at a point of incidence of the scan beam corresponding to the second step of rotation, wherein the second step of rotation precedes the first step of rotation.

11. The scanning apparatus of claim 10, wherein the processor is operating to store a first distance as a function of the measured distance between the laser distance measuring head and the point of incidence of the scan beam on the target object at the second step of rotation.

12. The scanning apparatus of claim 11, wherein in response to identifying the first edge, the processor further operating to:
control the rotary mechanism to rotate the laser distance measuring head in intervals of the predetermined angle in a second direction, wherein the second direction is opposite to the first direction;
control the laser distance measuring head to direct a scan beam onto the target object at a point of incidence at each step of rotation;
measure a distance between the laser distance measuring head and a point of incidence of the scan beam on the target object at each step of rotation;
when a difference between a measured distance at a first step of rotation and a measured distance at a second step of rotation exceeds beyond the predetermined threshold value, identify that a second edge of the target object has occurred at a point of incidence of the scan beam corresponding to the second step of rotation, wherein the second step of rotation precedes the first step of rotation;
store a second distance as a function of the measured distance between the laser distance measuring head and the point of incidence of the scan beam on the target object at the second step of rotation; and
determine an angle of rotation of the laser distance measuring head between the first edge and the second edge.

13. The scanning apparatus of claim 12, wherein, when the laser distance measuring head is positioned to scan a first surface of the target object, the processor is further operating to:
determine a length (L) of the target object as a function of the first distance, the second distance, and the angle of rotation of the laser distance measuring head, when an axis of the rotation of the laser distance measuring head is parallel to a plane of the first surface of the target object;
rotate, using the pivot mechanism, the second mount through a given angle to measure a height (H) of the target object using the rotary mechanism and the laser distance measuring head at the given angle;
determine, the height (H) of the target object as a function of the first distance, the second distance, and the angle of rotation of the laser distance measuring head, when an axis of the rotation of the laser distance measuring head is perpendicular to a plane of the first surface of the target object; and
rotate, using the pivot mechanism, the second mount to position the laser distance measuring head to scan a second surface of the target object to: determine a width (W) of the target object as a function of the first distance, the second distance, and the angle of rotation of the laser distance measuring head, when an axis of the rotation of the laser distance measuring head is parallel to a plane of the second surface of the target object.

14. The scanning apparatus of claim 13, wherein the processor is operating to determine:
the length (L) of the target object by a mathematical equation:

$$L^2 = a^2 + b^2 - 2ab \cos \alpha;$$

the height (H) of the target object by a mathematical equation:

$$H^2 = a^2 + b^2 - 2ab \cos \alpha; \text{ and}$$

the width (W) of the target object by a mathematical equation:

$$W^2 = a^2 + b^2 - 2ab \cos \alpha;$$

wherein a is the first distance, b is the second distance, and $\alpha$ is the angle of rotation of the laser distance measuring head.

15. The scanning apparatus of claim 14, wherein the processor is operating to select a mode of operation of the scanning apparatus for measuring dimensions of the target object, the mode of operation being at least one of:
a linear dimension calculating mode, wherein the processor is operating to determine at least one of the length, the height, the width, a radius, and a diameter of the target object as a function of at least one of the first distance, the second distance, and the angle of rotation of the laser distance measuring head;
an area calculating mode, wherein the processor is operating to determine an area of a two-dimensional target object and a surface area of a three-dimensional target object as a function of at least one of the length, the height, the width, a radius, and a diameter of the target object; and
a volume calculating mode, wherein the processor is operating to determine a volume of the target object as a function of at least one of the length, the height, the width, a radius, and a diameter of the target object.

16. The scanning apparatus of claim 15, wherein the processor is operating to select the area calculating mode for determining an area (A) of a two-dimensional target object as a function of a shape of the target object, the processor is further operating to:
determine the area (A) of the target object by a mathematical equation:

$$A = L^2,$$

when the shape of the target object is square;
determine the area (A) of the target object by a mathematical equation:

$$A = LH,$$

when the shape of the target object is rectangular; and
determine the area (A) of the target object by a mathematical equation:

$$A = 3.14 R^2,$$

when the shape of the target object is circular, wherein a radius (R) of the target object is calculated by a mathematical equation:

$$R = a \tan \alpha/2.$$

17. The scanning apparatus of claim 15, wherein the processor is operating to select the area calculating mode for determining a surface area ($A_s$) of a three-dimensional target object as a function of a shape of the target object, the processor is further operating to:
determine the surface area ($A_s$) of the target object by a mathematical equation:

$$A_s = 6L^2,$$

when the shape of the target object is cubical;
determine the surface area ($A_s$) of the target object by a mathematical equation:

$$A_s = 2(LH + HW + WL),$$

when the shape of the target object is cuboidal;
determine the surface area ($A_s$) of the target object by a mathematical equation:

$A_s=6.28R(R+H)$, when the shape of the target object is cylindrical, wherein a radius (R) of the target object is calculated by a mathematical equation:

$R=a \tan \alpha/2$;

determine the surface area ($A_s$) of the target object by a mathematical equation:

$A_s=3.14R(a+R)$, when the shape of the target object is conical, wherein a radius (R) of the target object is calculated by a mathematical equation:

$R=a \tan \alpha/2$; and determine the surface area ($A_s$) of the target object by a mathematical equation:

$A_s=12.56R^2$, when the shape of the target object is spherical, wherein a radius (R) of the target object is calculated by a mathematical equation:

$R=a \tan \alpha/2$.

18. The scanning apparatus of claim 15, wherein the processor is operating to select the volume calculating mode for determining a volume (V) of the target object as a function of a shape of the target object, the processor is further operating to:
determine the volume (V) of the target object by a mathematical equation:

$V=L^3$, when the shape of the target object is cubical;
determine the volume (V) of the target object by a mathematical equation:

$V=LHW$, when the shape of the target object is cuboidal;
determine the volume (V) of the target object by a mathematical equation:

$V=3.14R^2H$, when the shape of the target object is cylindrical, wherein a radius (R) of the target object is calculated by a mathematical equation:

$R=a \tan \alpha/2$;

determine the volume (V) of the target object by a mathematical equation:

$V=1.046R^2$ when the shape of the target object is conical, wherein a radius (R) of the target object is calculated by a mathematical equation:

$R=a \tan \alpha/2$; and determine the volume (V) of the target object by a mathematical equation:

$V=4.186R^3$, when the shape of the target object is spherical, wherein a radius (R) of the target object is calculated by a mathematical equation:

$R=a \tan \alpha/2$.

19. A method of operating a scanning apparatus comprising a laser distance measuring head for identifying an edge of a target object, the method comprising:
directing a scan beam generated by the laser distance measuring head onto the target object at a point of incidence;
determining a first measured distance between the laser distance measuring head and a point of incidence of the scan beam on the target object, the scanning apparatus comprising: a rotary mechanism configured to rotate the laser distance measuring head; and, a pivot mechanism configured to rotate the rotary mechanism through an angle such that an axis of rotation of the laser distance measuring head is rotated through the angle;
rotating, using the rotary mechanism, the laser distance measuring head by a predetermined angle in a first direction and directing a scan beam generated by the laser distance measuring head onto the target object at a point of incidence;
determining a second measured distance between the laser distance measuring head and a point of incidence of the scan beam on the target object;
determining a difference between the second measured distance and the first measured distance;
when the difference exceeds a predetermined threshold value, identifying that a first edge of the target object has occurred at the point of incidence of the scan beam corresponding to the first measured distance;
when the difference is less than the predetermined threshold value, setting the first measured distance to have value of the second measured distance, and repeating the operations of rotating the laser distance measuring head by the predetermined angle in the first direction, determining a second measured distance between the laser distance measuring head and a point of incidence of the scan beam on the target object, and determining a difference between the second measured distance and the first measured distance until a first edge of the target object is identified; and
rotating, using the pivot mechanism, the rotary mechanism through the angle to identify another edge of the target object in another direction.

* * * * *